United States Patent

[11] 3,547,473

[72] Inventor Rudolf Gottschald
 Osterath, Am Meerbusch, Germany
[21] Appl. No. 598,832
[22] Filed Dec. 2, 1966
[45] Patented Dec. 15, 1970
[73] Assignee A. Ehrenreich & Cie
 Dusseldorf-Oberkassel, Germany
[32] Priority Dec. 3, 1965
[33] Germany
[31] No. E22609

[54] BELLOW PACKINGS FOR UNIVERSALLY MOVABLE JOINTS, ESPECIALLY FOR BALL JOINTS
 3 Claims, 2 Drawing Figs.
[52] U.S. Cl. .................................................... 287/87,
 277/178, 277/212
[51] Int. Cl. ..................................................... F16c 11/06,
 F16b 7/00, B25g 3/38
[50] Field of Search............................................ 277/178,
 212F, 212FB; 287/90A, 90C, 87; 74/18.1; 287/87

[56] References Cited
UNITED STATES PATENTS

| 2,462,023 | 2/1949 | Johanson et al. | 74/18.1 |
| 3,269,758 | 8/1966 | Ulderup et al. | 287/87 |
| 3,292,957 | 12/1966 | Ulderup | 277/212 |
| 3,164,389 | 1/1965 | Thomas | 287/90A |
| 3,175,834 | 3/1965 | Wallace et al. | 277/212 |

FOREIGN PATENTS

| 1,005,682 | 9/1965 | Great Britain | 287/90A |

Primary Examiner—Samuel Rothberg
Attorney—Arthur Schwartz

ABSTRACT: A ball and socket joint having a bellow packing secured to the housing wherein the packing has a thickened portion forming a beadlike ring. The ring is inserted into an annular groove having substantially symmetrical faces. A lip extends along the housing and is connected to the ring.

PATENTED DEC 15 1970

3,547,473

INVENTOR
RUDOLF GOTTSCHALD

BY

ATTORNEY

BELLOW PACKINGS FOR UNIVERSALLY MOVABLE JOINTS, ESPECIALLY FOR BALL JOINTS

My invention relates to a bellow packing for the opening where the joint pin leaves the joint case of universally movable joints, and more particularly of ball joints the joint case of which has an exterior peripheral groove on the side of the passage opening for the joint pin for securing the bellow rim facing the joint case, and the object of my invention is to provide a simplified and improved attachment of the packing bellows at the case.

So far the bellow rim facing the case is drawn in for the purpose of fixing the same to the joint case and forms an U-shaped channel which is open towards the outside the back of said channel snapping into the peripheral groove of the joint case and said channel being drawn against the bottom of the peripheral groove by means of a tension ring inserted into the channel. The tension ring is subject to outside influences. Damage to or destruction of the same results in termination of secure attachment of the bellows to the case and of the packing at the case. The tension ring is also exerting a squeezing pressure on the bellow rim which pressure is detrimental to the elastic material of the bellows.

According to the present invention the bellow rim facing the case is thickened at the inside to form a beadlike ring while said ring is pretensioned and inserted into the peripheral groove of the case.

By this measure it will be achieved that the bellow packing, without any outside squeezing pressure, is subject to tight and durable attachment at the case which attachment is subject to tensional force without negatively influencing the packing and in which the bellow rim will not be exposed to exterior squeezing pressure. The thickened area fits snugly into the peripheral groove.

The bellow rim facing the case may be thickened to form a ring projecting on either side of the bellow wall the part of the ring facing the inside being pretensioned and inserted into the peripheral groove of the case.

The thickened area on either side results in an especially well tensioned and favorable fit of the thickened area of the ring facing the inside with respect to the groove.

It may be recommendable to provide the thickened bellow rim with a tip fitting snugly in the direction of the case or with such lip.

The tip or lip is favorable with a view to the desired sealing effect and prevents dust or dirt from accumulating at the outside engaging connection of the thickened area of the ring into the peripheral groove which, as the ball joint moves, may result in a grinding action at the engaging connection.

The drawing shows two examples of a construction according to the present invention.

The joint case of which only a part has been shown has been identified as 1. The joint pin has been indicated as 2, 3 is the elastic bellow packing.

At the opening where the joint pin leaves the joint case the joint case has a peripheral groove 4 at the outside for securing the packing rim facing the joint case to the latter.

Figure 1:
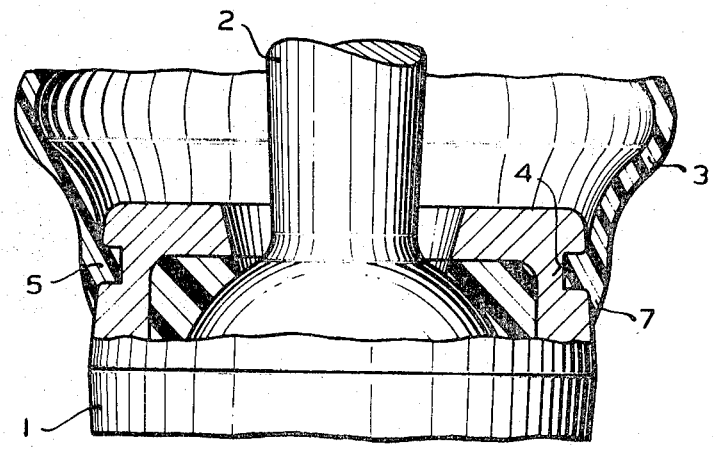
FIG. 1 is a vertical section of the side of the bellow packing which is attached to the joint case.

As shown in FIG. 1 the packing bellow rim facing the joint case has been thickened to form a beadlike ring 5. The thickened area of the ring is inserted into the peripheral groove 4 and engages into the same under pretension. The thickened area of the ring fits snugly into the peripheral groove.

Figure 2:
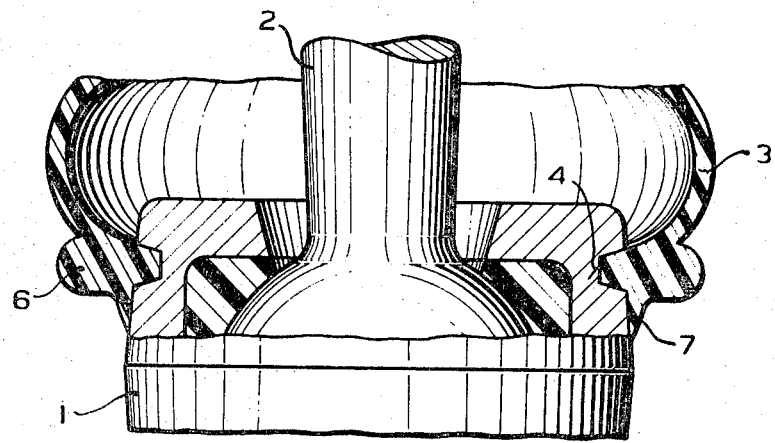
FIG. 2 is a section of a corresponding embodiment as shown in FIG. 1.

With the embodiment as shown in FIG. 2 the bellow rim facing the case has been thickened on either side of the bellow wall to form a projecting ring 6. The interior part of the ring is pretensioned and inserted into the peripheral groove 4.

It will also be possible, as may be seen from FIG. 2, that the thickened ring which is inserted into the peripheral groove is tapered towards the inside which measure has a favorable bearing on the insertion of the thickened ring under tension into the peripheral groove while said ring continues to be able to snugly fit into the groove since, due to pretension, the ring in question is deformed correspondingly.

In direction of the joint case the thickened bellow rim has been provided with a tip 7 or such lip which is in close contact with the outside of the joint case.

I claim:
1. A ball and socket joint comprising:
    a. a housing;
    b. a ball member within said housing;
    c. a joint pin having one end attached to said ball member and extending outwardly from an opening in one end of said housing;
    d. said housing having an annular groove with a pair of substantially symmetrical faces thereon and a substantially cylindrical bottom edge connecting said faces;
    e. a bellow packing having a thickened portion forming a beadlike ring, complemental in shape to the annular groove said ring being pretensioned and extending radially inwardly into said groove;
    f. a tapered lip extending axially along in close contact with said housing and connected to said ring.
2. A ball and socket joint as defined in claim 1 including a projecting ring on said bellow packing extending in a radially outward direction from said beadlike ring.
3. A ball and socket joint as defined in claim 2 wherein said faces converge inwardly toward said groove.